(12) United States Patent
Kamiji et al.

(10) Patent No.: US 6,466,849 B2
(45) Date of Patent: Oct. 15, 2002

(54) OCCUPANT POSITION DETECTION SYSTEM

(75) Inventors: Kouichi Kamiji; Kazutomo Isonaga; Makoto Nagai; Tsutomu Fukui; Nobuhiro Koyota; Naotaka Kumakiri, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/796,610

(22) Filed: Mar. 2, 2001

(65) Prior Publication Data

US 2001/0025214 A1 Sep. 27, 2001

(30) Foreign Application Priority Data

Mar. 21, 2000 (JP) ......................................... 2000-078622
Mar. 27, 2000 (JP) ......................................... 2000-085546

(51) Int. Cl.[7] .................................................. G06F 7/00
(52) U.S. Cl. ........................... 701/45; 701/49; 280/735; 180/271

(58) Field of Search ....................... 701/45, 49; 307/9.1, 307/10.1; 280/734, 735, 728.1; 180/271, 273

(56) References Cited

U.S. PATENT DOCUMENTS 6,078,854 A * 6/2000 Breed et al. .................. 701/49
6,292,727 B1 * 9/2001 Norton ........................ 701/45

* cited by examiner

*Primary Examiner*—Yonel Beaulieu
(74) *Attorney, Agent, or Firm*—Armstrong, Westerman & Hattori, LLP

(57) ABSTRACT

An occupant position detection system includes a distance sensor 4 located on a seat back 3 of a seat of a vehicle, an angle sensor 5 for sensing an inclined angle of the seat back 3, and a sliding displacement sensor 6 for sensing a sliding displacement value of the seat in fore and aft directions, wherein an occupant position is detected on the basis of sensed values of the distance sensor 4, the angle sensor 5 and the sliding displacement sensor 6.

3 Claims, 8 Drawing Sheets

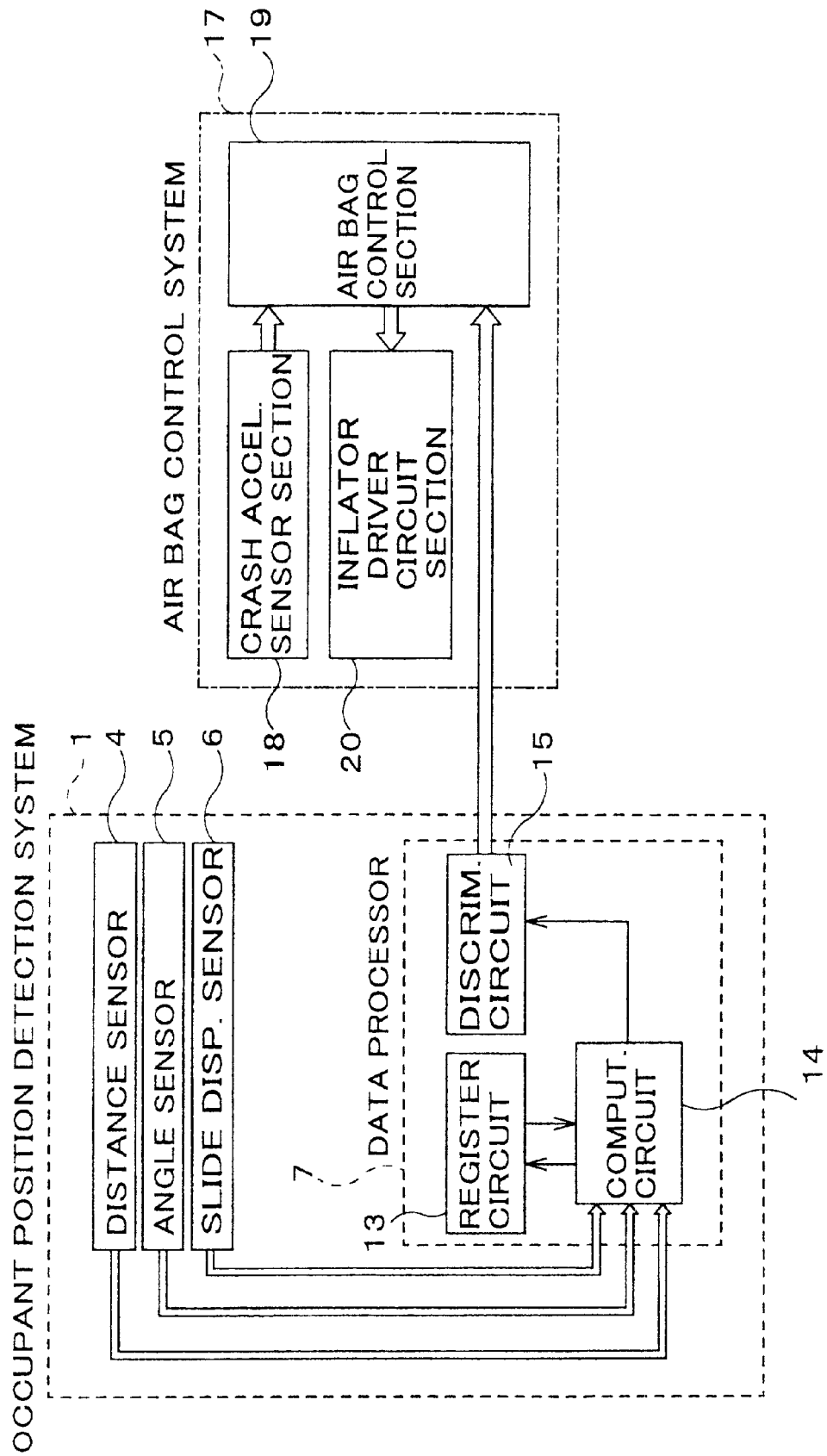

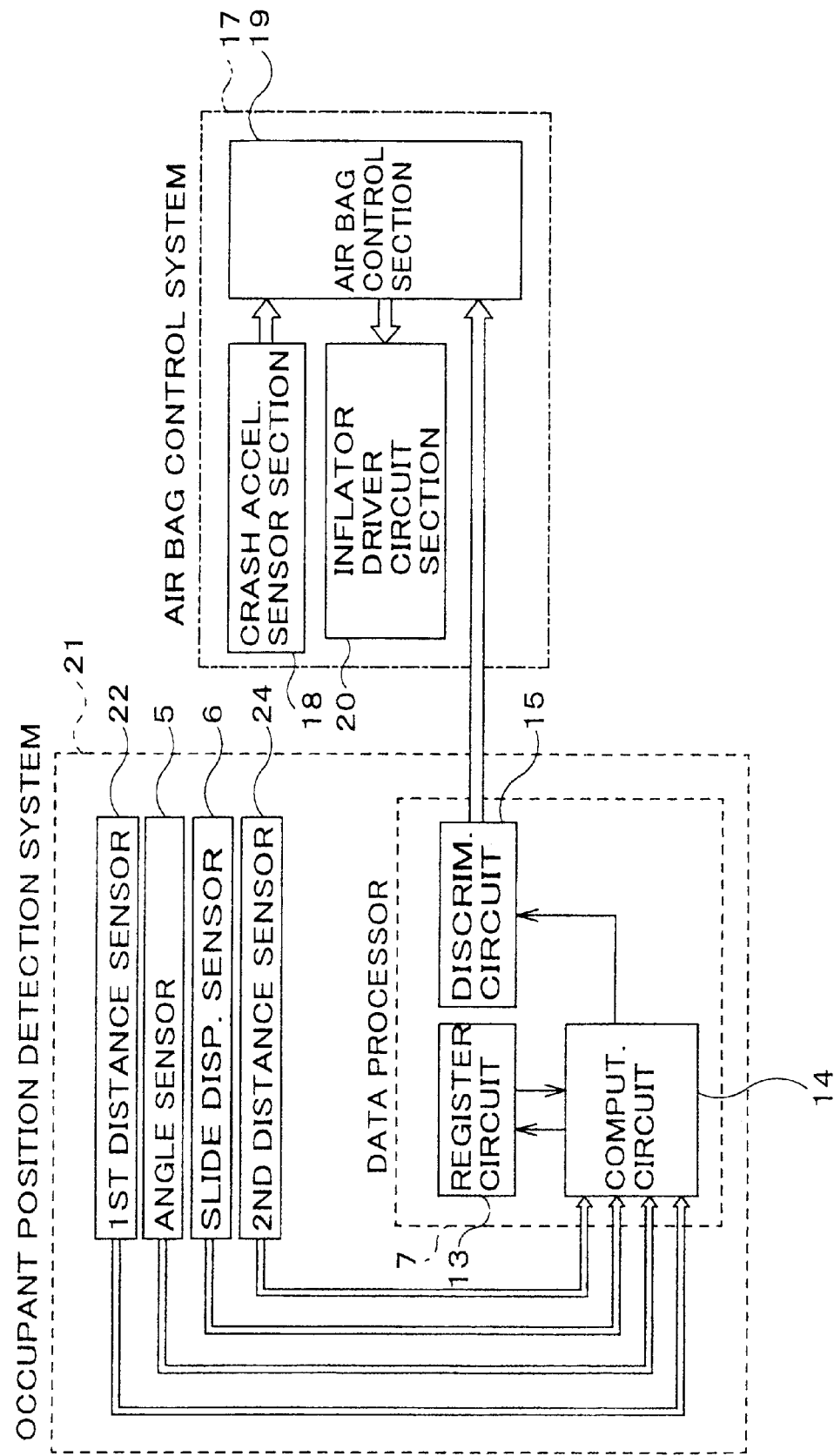

OCCUPANT POSITION DETECTION SYSTEM

FIELD OF THE INVENTION

The present invention relates to an occupant position detection system for detecting an occupant position in a seat of a vehicle.

BACKGROUND OF THE INVENTION

A vehicle may contain a device for detecting a position of an occupant who sits in a seat of a vehicle for purposes of mitigating occupant injury. In order to sense the distance to the occupant from an instrument panel of the vehicle as an occupant position, a position sensor is used which incorporates either an infrared beam or an ultrasonic beam as the sensing element which transmits sensing beams such as either the infrared beam or the ultrasonic beams to the occupant from a distance sensor located on the instrument panel.

FIGS. 8A to 8C show an example wherein a distance sensor 103 is mounted on an instrument panel 101 of a vehicle to sense the distance between the instrument panel 101 and an occupant 102.

In such a sensing system, the distance sensor 103 first transmits one or more sensing beams to the occupant 102. The sensing beams are reflected off the occupant 102 and, so, a sensor section of the distance sensor 103 enables to sense the reflected sensor beams. When this occurs, the time interval between the sensing beams transmitted from the distance sensor 103 to the occupant 102 and the sensing beams reflected off the distance sensor 103 from the occupant 102 is measured, enabling to sense the distance to the occupant 102 from the instrument panel 101 on the basis of the sensed time interval and the transmission velocity of the sensing beams.

SUMMARY OF THE INVENTION

In such a distance sensor 103, when there is the presence of an object 105 such as a book or hand baggage, held by an occupant, between the instrument panel and the occupant as viewed in FIG. 8A, the distance sensor 103 is caused to measure the distance between the instrument panel 101 and the object 105 as a false distance between the instrument panel 101 and the occupant.

It is therefore an object of the present invention to provide an occupant position detection system which enables to correctly detect an occupant position regardless of a condition of a seat back of a vehicle seat, an occupant posture or an object held by the occupant in close proximity to an instrument panel.

According to one aspect of the present invention, there is provided an occupant position detection system which includes distance sensor means located on a seat back of a seat of a vehicle, angle sensor means for sensing an inclined angle of the seat back, and sliding displacement sensor means for sensing a sliding displacement value of the seat in the fore and aft directions.

The occupant position is detected by the distance sensor means, the angle sensor means and the sliding displacement sensor means.

With such an occupant position detection system, the occupant position is detected by the distance sensed by the distance sensor means mounted on the seat back, the inclined angle and the sliding displacement value of the seat in fore and aft direction and, therefore, it is possible to correctly detect the distance to the instrument panel from the occupant even when the obstacle such as the book or the hand baggage exists between the instrument panel and the occupant.

According to another aspect of the present invention, there is provided an occupant position detection system which includes first distance sensor means located on a seat back of a seat of a vehicle, second distance sensor means located on an instrument panel of the vehicle, angle sensor means for sensing an inclined angle of the seat back, and sliding displacement sensor means for sensing a sliding displacement value of the seat in fore and aft directions. A first distance is computed responsive to signals output from the first distance sensor means, the angle sensor means and the sliding displacement sensor means, and an occupant position is detected by the first distance and a second distance sensed by the second distance sensor means.

With such an occupant position detection system, the occupant position is detected on the basis of the first distance sensed from the rear side of the occupant and the second distance sensed from the front side of the occupant and, thus, it is possible to correctly detect the distance to the instrument panel from the occupant regardless of the conditions of the seat, the occupant posture or the object held by the occupant in close proximity to the instrument panel.

According to a further aspect of the present invention, there is provided an occupant position detection system wherein the first distance corresponds to a sensed distance to the occupant from the instrument panel which sensed distance is computed on the basis of a distance sensed from a rear side of the occupant, and wherein the first and second distances are compared to detect the occupant position.

With such an occupant position detection system, the first distance computed on the basis of the value detected from the rear side of the occupant is utilized as the distance between the instrument panel and the occupant and, accordingly, it is possible to directly compare the first and second distances. With such a comparison of the distances of two kinds, it is possible to correctly detect the distance to the instrument panel from the occupant in a more reliable manner.

BRIEF DESCRIPTION OF THE DRAWINGS

Preferred embodiments of the present invention will be described below, by way of example only, with reference to the accompanying drawings, in which:

FIG. 1 is a block diagram illustrating a preferred embodiment of an occupant position detection system according to the present invention and an air bag restraint control system associated therewith;

FIG. 4 is a block diagram illustrating an alternative preferred embodiment of an occupant position detection system according to the present invention and an air bag associated therewith;

DESCRIPTION OF THE PREFERRED EMBODIMENT

Figure 2A:
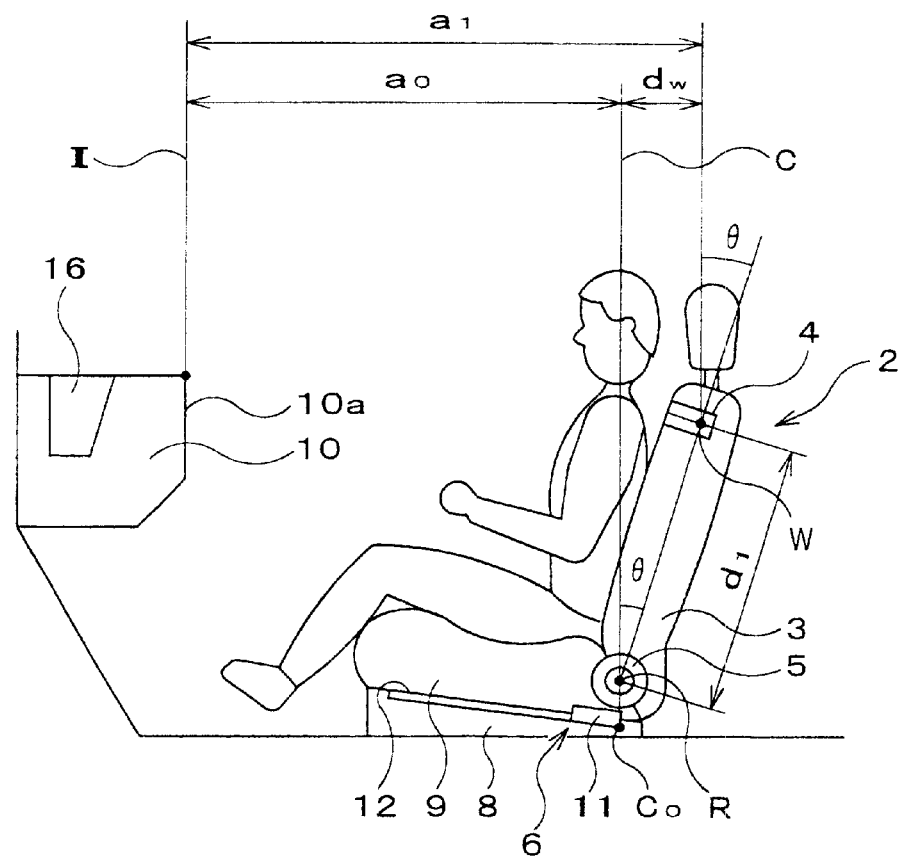
FIG. 2A is a partial cross sectional view of an inner part of a vehicle equipped with the occupant position detection system according to the present invention.
Figure 2B:
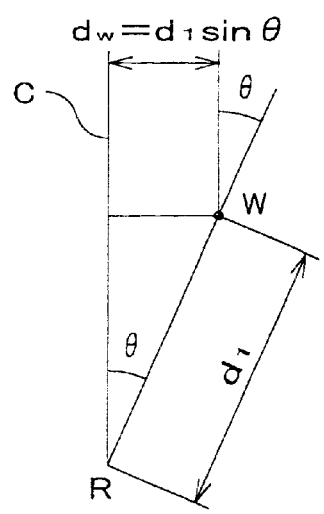
FIG. 2B is a view illustrating a principle to compute the distance between a reference line and a distance sensor.

A preferred embodiment of an occupant position detection system according to the present invention will be described with reference to FIG. 1 and FIGS. 2A and 2B, wherein FIG. 1 is a block diagram showing an occupant seat position detection system and FIG. 2A is a cross sectional view of a part of a vehicle showing inside.

Referring to FIGS. 1 and 2A, the occupant position detection system 1 includes a distance sensor 4 located on a seat back 3 of an assistant occupant seat 2 and serving as a first distance sensor, an angle sensor 5 that senses an inclined angle of the seat back 3, a sliding displacement sensor 6 that senses a sliding displacement value when the assistant occupant seat 2 slides in fore and aft directions, and a data processor 7.

In the preferred embodiment of the present invention, the word "sensing" is herein meant to obtain a primary data such as an inclined angle and the word "detecting" is meant to process, compare and discriminate the sensed data.

As shown in FIG. 2A, the assistant occupant seat 2 is mounted on a base 8 and includes a seat bottom 9 that is slidable on the base 8, and a seat back 3 standing upright from the seat bottom 9 and tiltable about a rotational center R at a rear part of the seat bottom 9.

Here, it is to be noted that a first vertical line crossing the rotational center R is defined as a reference line C and a second vertical line crossing a rear end 10a of an instrument panel 10 located in front of the assistant occupant seat 2 is defined as a reference line I.

The distance sensor 4 is located in an upper part of the seat back 4 and includes an ultrasonic beam transmitter and a receiver or sensor to sense a reflected ultrasonic beam. The distance sensor 4 measures a time interval between the ultrasonic beam transmitted to the occupant and the ultrasonic beam reflected off the head or shoulder portions of the occupant, generating an output indicative of the distance between the occupant and the seat back 3.

The angle sensor 5 is mounted at the rotational center R and measures an angle of the seat back 3 that is inclined from a reference position thereof. The angle sensor 5 may include a contact type switch, an electromagnetic switch or a variable resistor, either of which is located in concentric relation with the rotational center R such that an incremental displacement value of the inclined angle is measured using a variation in electric current caused by electrical variations, magnetic flux variations or electrical resistance variations produced by switch terminals mounted on the seat back 3 in direct contact or in close proximity relationship.

The sliding displacement sensor 6 includes a sliding displacement sensing element 11 mounted beneath the rotational center R, and a plurality of switch elements such as contact type switch elements, magnetic switch elements or variable resistors which are mounted on a guide rail 12 of the base 8 in an equally spaced relationship. The sliding displacement sensor 11 measures a sliding displacement value of the assistant occupant seat 2, when it slides from a reference point $C_o$ lying on the reference line C, with the use of electrical variations, magnetic flux variations or electrical resistances.

As shown in FIG. 1, the data processor 7 includes a register circuit 13, a computing circuit 14 and a discrimination circuit 15. The computing circuit 14 computes the distance D between the -occupant and the instrument panel 10 responsive to a time incremental data delivered from the distance sensor 4 and first and second electric current signals delivered from the angle sensor 5 and the sliding displacement sensor 6, respectively. The discriminating circuit 15 discriminates whether the distance D between the occupant and the instrument panel 10 that has been calculated is larger or smaller than a preset data $D_L$ which will be described later.

Figure 3A:
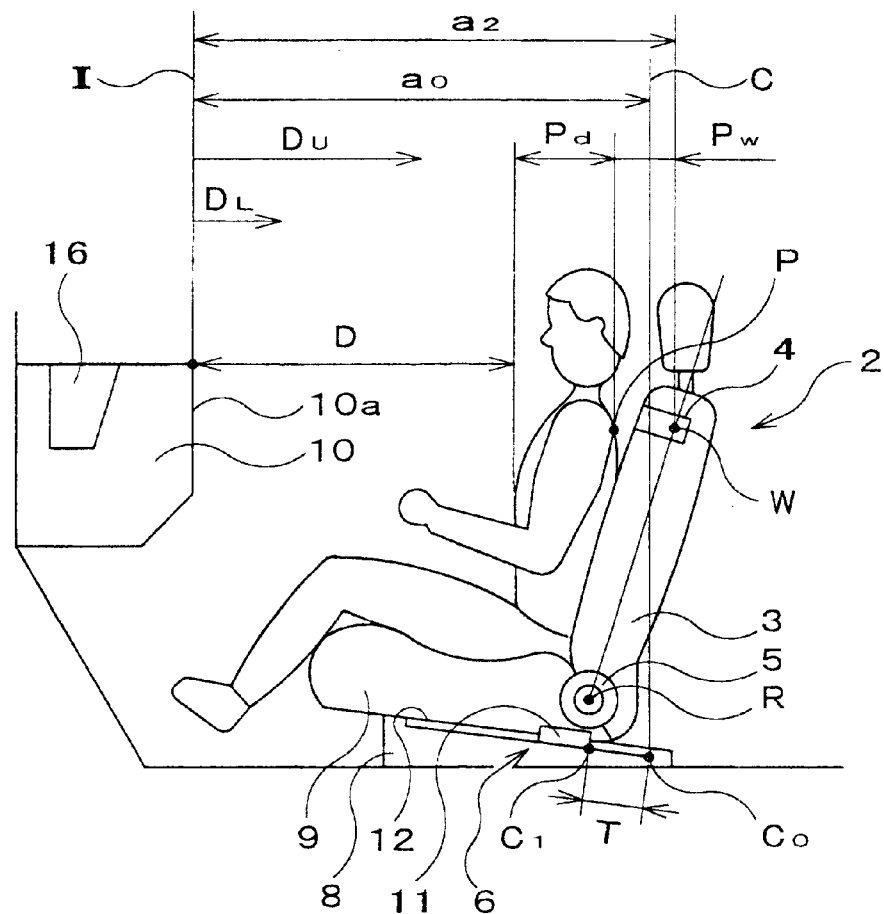
FIG. 3A is a partial cross sectional view of the inner part of the vehicle.
Figure 3B:
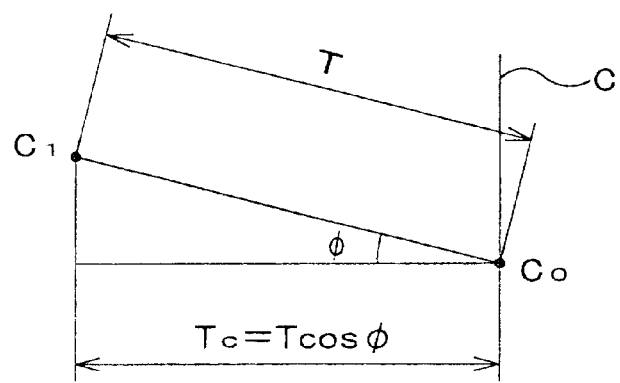
FIG. 3B is a view illustrating a principle to compute a sliding displacement value of a seat bottom of a seat relative to the reference line.

Also, the register circuit 13 stores data including a distance d, between the rotational center R in FIG. 2A and the distance sensor 4, a distance $a_o$ between the reference lines I and C and an average thickness $P_d$ of an occupant body in FIG. 3A, and an inclined angle $\Phi$ of the guide rail 12 in FIG. 3B. Further, the register circuit 13 may store other data such as the inclined angle of the seat back 3 and the sliding displacement value of the seat bottom 9, if desired.

Now, a detailed description will be given to how the distance D (which will be hereinafter referred to as the distance between the reference line I and the occupant) between the instrument panel 10 and the occupant with reference to FIGS. 2A and 2B and FIGS. 3A and 3B. Also, for the sake of clarity, it is assumed that the assistant occupant seat 2 is first moved to the rearmost position, the occupant sits on the seat 2 and, thereafter, the occupant seat 2 is caused to slide in a given slight displacement value.

When an occupant sits in the assistant occupant seat 2, the occupant position detection system 1 initially senses the distance $a_1$ to the distance sensor 4 from the reference line I in FIG. 2A.

Since, in this event, the seat back 3 is inclined at an angle θ, the distance sensor 4 is displaced rearward from the reference line C by a horizontal displacement value $d_w$. Accordingly, the computing circuit 14 computes the horizontal displacement value $d_w$ of the distance sensor 4 in a manner as shown in FIG. 2B in response to the inclined angle θ obtained from the electric current delivered from the angle sensor 5 and the distance $d_1$ to the distance sensor 4 from the rotational center R.

In addition, it is possible to obtain the distance $a_1$ to the distance sensor 4 from the reference line I by combining the distance $a_o$ between the reference lines I and C with the horizontal displacement value $d_w$ of the distance sensor 4.

Next, as shown in FIG. 3A, when the assistant occupant causes the assistant occupant seat to slide in a forward direction by a slide displacement value T, the occupant position detection system 1 senses the distance $d_2$ to the distance sensor 4 from the reference line I.

The distance sensor 4 is moved closer to the instrument panel 10 from the reference line a, by a horizontal slide displacement value $T_c$ (see FIG. 3B) which is a horizontal component of the sliding displacement value T. Consequently, the computing circuit 14 computes the horizontal sliding displacement value $T_c$ in a manner as shown in FIG. 3B by combining the sliding displacement value T obtained from the electric current delivered from the slide displacement sensor 6 with the inclined angle Φ of the guide rail 12 stored in the register circuit 13.

In addition, it is possible to obtain the distance $a_2$ to the distance sensor 4 from the reference line I when the horizontal displacement values $T_c$ is subtracted from the distance $a_1$.

Further, the computing circuit 14 of the occupant position detection system 1 computes the distance $P_W$ to the distance sensor 4 from a point P of the occupant shoulder in FIG. 2A by dividing the computed value in half which value is obtained by multiplying the transmission speed of the ultrasonic beam to the time incremental data measured by the distance sensor 4.

Also, it is possible to obtain the distance D from the reference line I by subtracting the distance $P_W$, to the point P of the occupant shoulder from the distance sensor 4, from the distance $a_2$ to the distance sensor 4 from the reference line I, and by further subtracting the body thickness $P_d$ of the occupant.

An alternative preferred embodiment of an occupant position detection system according to the present invention will be described below with reference to FIGS. 4 to 7, with like parts bearing like reference numerals as those used in FIGS. 1 to 3B.

Figure 5A:
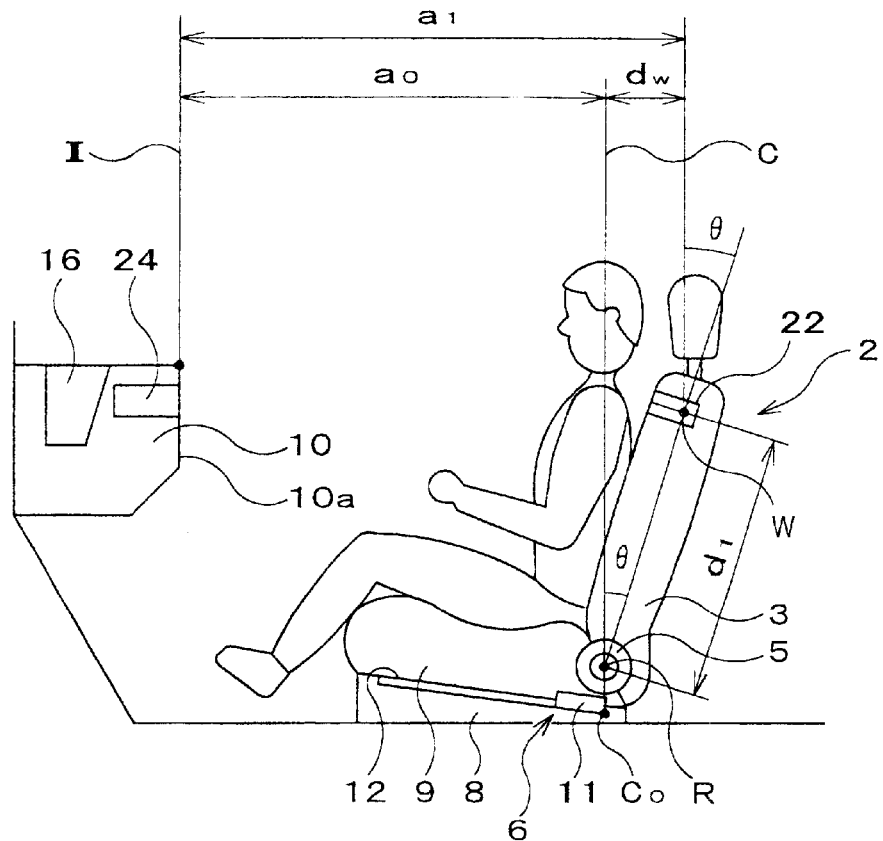
FIG. 5A is a partial cross sectional view of the inner part of the vehicle equipped with the alternative preferred embodiment of the occupant position detection system according to the present invention.
Figure 8A:
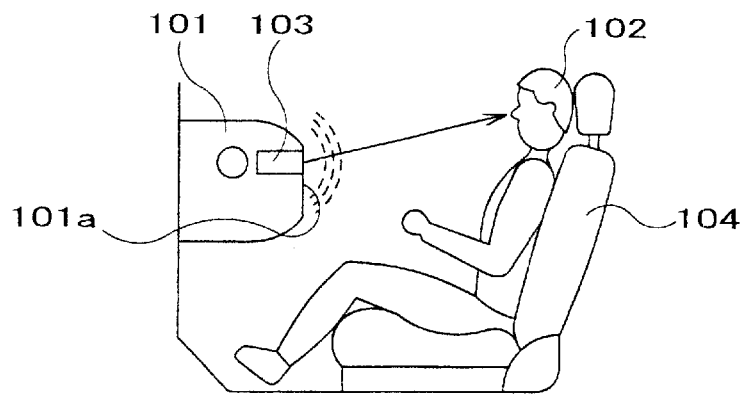
FIGS. 8A, 8B and 8C are side views illustrating a conventional occupant position detection system.
Figure 8B:
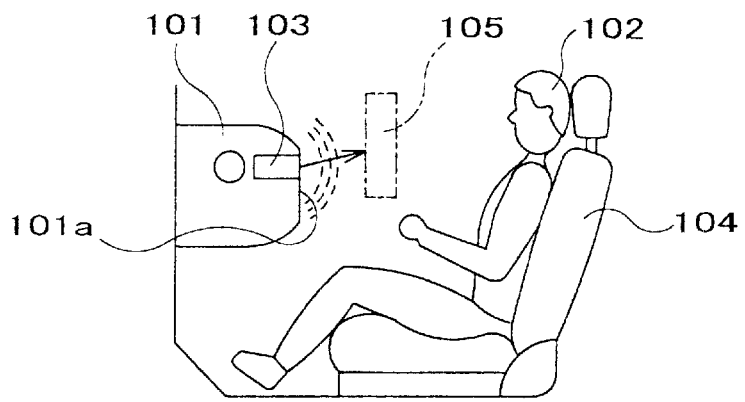
Figure 8C:
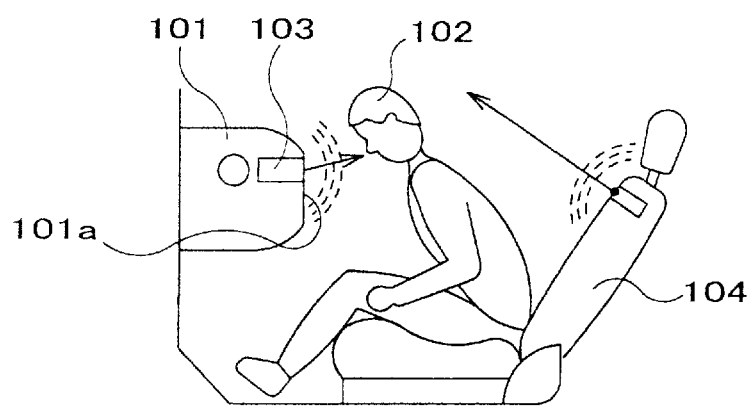

FIG. 4 is a block diagram of the occupant position detection system of the alternative preferred embodiment, and FIG. 5A is a cross sectional view of a part of a vehicle showing inside. Also, the occupant position detection system of the alternative embodiment is effective for cases wherein it is difficult to detect the position of the occupant 102, that is, when the occupant 102 is folded forward with the seat back 104 is excessively tilted rearward as shown in FIG. 8C.

As shown in FIG. 4, the occupant position detection system 21 includes a first distance sensor 22, an angle sensor 5 for sensing an inclined angle of the seat back 3, a sliding displacement sensor 6 for sensinging a sliding displacement value of the assistant occupant seat 2 when the assistant occupant seat 2 slides in fore and aft directions, a second distance sensor 24 mounted on the instrument panel 10, and a data processor 7.

As shown in FIG. 5A, also, the assistant occupant seat 2 equipped with the second distance sensor 22 is mounted on the base 8 and includes a seat bottom 9 that is slidable on the base, and a seat back 3 that is tiltable about the rotational center R located at the rear part of the seat bottom 9.

The first distance sensor 22 is an ultrasonic beam transmitter located at an upper portion of the seat back 3 to transmit an ultrasonic beam toward the occupant, and a sensor section for sensing the reflected ultrasonic beam. The first distance sensor 22 measures the time interval between the ultrasonic beam transmitted to the occupant and the ultrasonic beam reflected back from the rearward head portion or the shoulder portions of the occupant.

The second distance sensor 24 includes an ultrasonic transmitter mounted on the instrument panel 10 at a position in opposed relationship to the occupant to transmit an ultrasonic beam toward the occupant, and a sensor section to sense the reflected ultrasonic beam. The second distance sensor 24 measures the time interval between the ultrasonic beam directed toward the occupant and the ultrasonic beam reflected off the front portion of the occupant.

As shown in FIG. 4, also, the data processor 7 includes a register circuit 13, a computing circuit 14 and a discrimination circuit 15.

The computing circuit 14 computes a first distance $D_1$ between the occupant and the instrument panel 10 by combining the time data delivered from the first distance sensor 22 and the electric current signals delivered from the angle sensor 5 and the slide displacement sensor 6. Also, the computing circuit 14 computes the second distance $D_2$ between the occupant and the instrument panel 10 responsive to the time data delivered from the second distance sensor 24.

The discriminating circuit 15 discriminates either one of the first distance D1 or the second distance D2 as the distance D between the instrument panel 10 and the occupant. Further, the discriminating circuit 15 discriminates whether the distance D is larger or smaller than a preset value $D_L$.

Figure 6A:
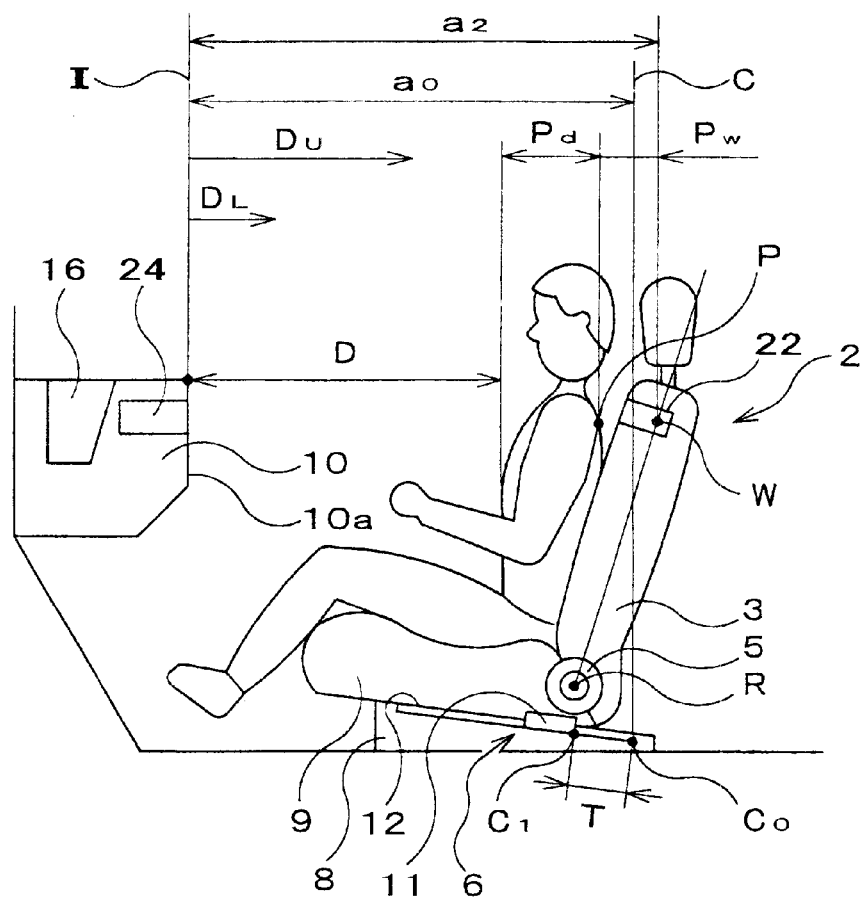
FIG. 6A is a partial cross sectional view of an inner part of a vehicle equipped with the preferred embodiment of the occupant position detection system according to the present invention.
Figure 6B:
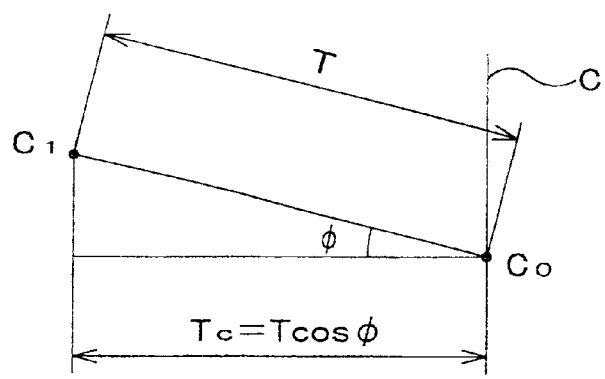
FIG. 6B is a view illustrating a principle to compute a sliding displacement value of a seat bottom from a reference line.

The register circuit 13 stores therein various data including the distance value $d_1$ to the first distance sensor 22 from the rotational center R in FIG. 5A, the distance $a_o$ between the reference lines I and C and the average body thickness value $P_d$ of the occupant in FIG. 6A, and the inclined angle Φ of the guide rail 12 in FIG. 6B. If desired, the register circuit 13 may further store other data such as the inclined angle of the seat back 3 and the sliding displacement value of the seat bottom 9.

Now, a computing method of the distance value D to the occupant from the reference line I will be described in detail with reference to FIGS. 4 to 7. For the sake of clarity, also, it is assumed that an assistant occupant sits in the assistant occupant seat 2 which remains in the rearmost sliding position and, subsequently, the assistant occupant seat 2 is caused to slide forward by a given displacement value.

Figure 5B:
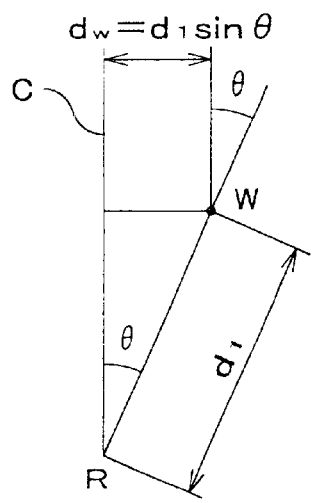
FIG. 5B is a view illustrating a principle to compute the distance between the reference line and the distance sensor.
Figure 7:
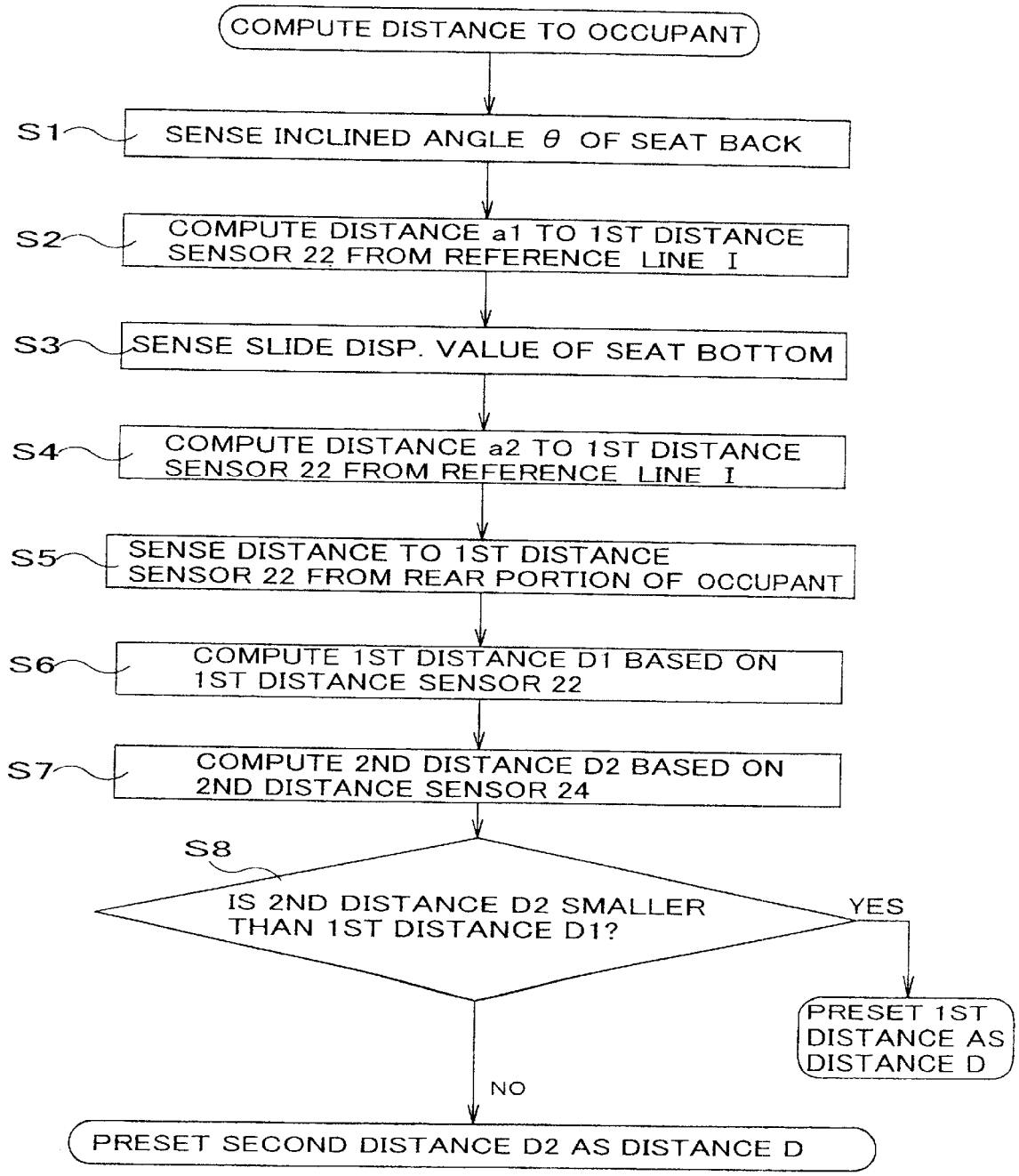
FIG. 7 is a flow chart illustrating the basic sequence for detecting an occupant position with the preferred embodiment of the occupant position detection system according to the present invention.

FIG. 7 is a general flow diagram for illustrating the basic sequence for computing the distance value D to the occupant from the reference line I. At the start S1, the inclined angle θ of the seat back 3 is sensed by the angle sensor 5 of the occupant position detection system 1 and, in step S2, the computing circuit 14 computes the distance value $a_1$ to the first sensor 22 from the reference line I. Since, in this event, the seat back 3 is tilted at an angle θ and the first distance sensor 22 is placed rearward by the horizontal displacement value $d_W$ from the reference line C, the computing circuit 14 computes the horizontal displacement value $d_W$ of the first distance sensor 22 in a manner as shown in FIG. 5B on the basis of the inclined angle obtained in the step S1 and the distance value $d_1$ to the first distance sensor from the rotational center R. Further, the horizontal displacement value $d_W$ is added to the distance value $a_o$ between the reference lines I and C, thereby obtaining the distance value $a_1$ to the first distance sensor 22 from the reference line I.

Next, when the occupant slides the assistant occupant seat 2 forward by the amount of sliding displacement value T, the sliding displacement value T of the assistant occupant seat 2 is sensed by the sliding displacement sensor 6 of the occupant position detection system 1 in step S3 and, in step S4, the distance value $a_2$ to the distance sensor 22 from the reference line I is obtained. In this event, the first distance sensor 22 is moved closer to the instrument panel 10 by the horizontal sliding displacement values $T_c$ which is a horizontal component of the sliding displacement value T from the distance value $a_1$ obtained in the step S2. Consequently, the computing circuit 14 computes the horizontal sliding displacement value $T_c$ in a manner as shown in FIG. 6B on the basis of the sliding displacement value T obtained in the step S3 and the inclined angle $\Phi$ of the guide rail 12 stored in the register circuit 13, thereby computing the distance value $a_2$ to the first distance sensor 22 from the reference line I by subtracting the horizontal sliding displacement value $T_c$ from the distance value $a_1$.

In step S5, further, the first distance sensor 22 senses the distance value $P_W$ to the first distance sensor 22 from the rear portion P of the occupant shown in FIG. 5A with the use of the ultrasonic beam.

In step S6, a first distance value D1 is computed by calculating the distance value to the occupant from the reference line I in response to outputs obtained in steps S1 to S5.

Here, the distance value D1 is obtained by subtracting the distance value $P_W$ to the rear portion P of the occupant from the first distance sensor 22 from the distance value $a_2$ to the first distance sensor 22 from the reference line I and by further subtracting the body thickness $P_d$ of the occupant.

In step S7, the computing circuit 14 computes a second distance value D2 sensed in front of the occupant with the use of the second distance sensor 24 on the basis of the time data measured by the second distance sensor 24.

In step S8, further, the discriminating circuit 14 compares the first distance value D1 sensed by the first distance sensor 22 and the second distance value D2 sensed by the second distance sensor 24.

In this event, when the second distance D2 is larger than the first distance value D1 (,that is, NO in step S8), the discriminating circuit 15 discriminates that it is difficult for the first distance sensor 22 to sense the occupant position as viewed in FIG. 8C and the second distance value D2 sensed in front of the occupant is used as the distance D to the occupant from the reference line I.

On the other hand, when it is measured that the second distance D2 is smaller than the first distance value D1 (,that is, YES in step 8), as would be caused for example by the presence of the extremeties of an occupant, or by the presence of an object such as a book or hand baggage held thereby, in close proximity to the sensor, the first distance value D1 sensed from the rear portion of the occupant is used as the distance D to the occupant from the reference line I.

Since the occupant position detection system 21 computes the distance to the occupant from the instrument panel 10 in conjunction with the distances of two kinds, i.e., a first distance D1 computed by using data detected from the rear portion of the occupant and a second distance computed by data detected from the front portion of the occupant and senses the occupant position by comparing the first and second distances, it is possible to correctly detect the occupant position in a reliable manner regardless of various situations such as the occupant's conditions or the inclined conditions of the seat back.

Next, examples of the occupant position detection systems of the preferred embodiments discussed above will be described in detail as applied for controlling deployment of an air bag of an air bag restraint device of a vehicle.

As shown in FIGS. 2A and 5A, the air bag restraint device 16 is accommodated in the instrument panel 10 and allows instantaneous deployment of the air bag inflator under the conditions of vehicle crash, thereby mitigating the risk of harm to the occupant.

While, in the vehicular air bag inflator, there is one technique for mitigating injury to occupants by the air bag inflator is to control the rate of inflation rate of the air bag inflator through control of the amount of gas generant in the air bag inflator responsive to the occupant seat position. The occupant position detection system of the preferred embodiments may be applied to the air bag inflator of the type discussed above for controlling the same.

In such an air bag restraint system 16, as shown in FIGS. 1 and 4, deployment of the air bag inflator is controlled by an air bag control system 17. The air bag control system 17 includes a crash acceleration (G) sensor section 18 for sensing a vehicle crash as an acceleration incremental value, an air bag unit control section 19 for controlling deployment of the air bag restraint device 16, and an inflator driver circuit section 20 to activate an exciter to supply gases to the air bag inflator.

Now, when the distance D to the occupant from the reference line I sensed by the occupant position detection system 1, 21 exceeds a preset value $D_L$, the discriminating circuit 15 of the data processor 7 outputs an actuating drive signal to the air bag control system 17 to allow deployment of the air bag inflator 16.

Also, it is to be noted that the preset value $D_L$ is a preliminarily preset value as shown in FIGS. 3A and 6A.

The air bag control system 17 responds to the actuating drive signal, enabling the air bag control section 19 to remain in an operating condition. Under these conditions, when the vehicle is subject to collisions, the crash acceleration sensor section 18 senses an acceleration incremental variation beyond a given value, and the air bag control section 19 outputs the actuating drive signal to the inflator driver circuit section 20, causing the inflator (not shown) to generate gases to allow deployment of the air bag inflator.

On the other hand, when the distance value D is lower than the preset value $D_L$, the discriminating circuit 15 does not output the actuating drive signal to the air bag control system 17 and the air bag control section 19 is disenabled.

Under these conditions, even when the crash acceleration sensor section 18 senses the acceleration incremental variation beyond the given preset value, the air bag control section 19 remains in the inoperative condition and does not output the actuating drive signal to the inflator driver circuit section 20. Accordingly, the air bag inflator is not actuated.

Since it is possible to detect the distance to the occupant from the instrument panel 10 in a highly reliable manner regardless of the conditions of the assistant occupant seat 2, the occupant posture or the object held by the occupant, the air bag restraint device 16 can be reliably operated. Thus, it is possible to effectively mitigate the risk of injury to the occupants when exposed to vehicle crashes.

Also, the present invention is not limited to the preferred embodiments illustrated in the drawings but may be widely modified and may have various applications. For example, although the occupant position detection system has been described as applied to the assistant occupant seat 2, the occupant position detection systems 1, 21 of the preferred embodiments may also be applied to a driver's seat or rear seats.

Further, in place of employing the ultrasonic beam, the distance sensor 4, the first and second distance sensors 22 and 24 may employ other expedient such as an infrared beam with an arbitrary wavelength.

Also, the second distance sensor 24 may be mounted in a vehicle at a position obliquely and forwardly of the occupant such that the distance to the occupant from the instrument panel 10 can be more reliably sensed. For example, it is possible to detect a correct occupant position even when the occupant sits aside in the seat either in right or left directions.

In addition, if it is assumed that the first distance corresponds to the distance to the rear point P of the occupant from the seat back 3, it is possible to sense whether the occupant sits in forward or rearward directions in the assistant occupant seat 2.

Further, the preset value of the discriminating circuit 15 may incorporate a preset value $D_u$ (see FIGS. 3A and 6A) which is larger than the aforesaid preset value $D_L$. In this event, when the distance D to the occupant from the reference line I obtained by the sensed result exceeds the preset value $D_u$, the air bag inflator is activated to its maximum volume and, when the distance is below the preset value $D_u$, the air bag inflator is activated to its half volume, providing a lower inflation capacity to reduce the risk of harm to occupants under the conditions of lower crash severity.

It is to be noted that the preset value $D_u$ is a preliminarily preset value responsive to a measure of the severity of the crash and the properties of the air bag restraint device 16.

It will now be understood from the foregoing description of the present invention that, in accordance with the present invention, an occupant position can be correctly detected in a highly reliable manner even in the presence of the extremities of an occupant, o4r by the presence of an object such as a books or hand baggage held thereby, in proximity to the sensor, by sensing the distance to the occupant from the seat back with the use of the distance sensor or mounted on the seat back, an inclined angle of the seat back and a sliding displacement value of a seat in fore and aft directions.

Since the occupant position detection system of the present invention is arranged to detect the distance to the occupant from the instrument panel by sensing the occupant position on the basis of a first distance computed by using data sensed from the rear portion of the occupant and a second distance computed by using data sensed from the front portion of the occupant.

Further, since both the first and second distances are computed as the distance to the occupant from the instrument panel and since the first and second distances are compared, it is possible to further correctly sense the distance to the instrument panel from the occupant.

While specific embodiments have been described in detail, those with ordinary skilled in the art will appreciate that various modifications and alternatives to those details could be developed in light of the overall teachings of the disclosure. Accordingly, the particular arrangements disclosed are meant to be illustrative only and not limiting as to the scope of the invention which is defined in the appended claims.

What is claimed is:

1. An occupant position detection system comprising:

distance sensor means located on a seat back of a seat of a vehicle;

angle sensor means for sensing an inclined angle of the seat back; and sliding displacement sensor means for sensing a displacement value of the seat in fore and aft directions;

wherein an occupant position is detected by the distance sensor means, the angle sensor means and the sliding displacement sensor means.

2. An occupant position detection system comprising:

first distance sensor means located on a seat back of a seat of a vehicle;

second distance sensor means located on an instrument panel of the vehicle;

angle sensor means for sensing an inclined angle of the seat back; and sliding displacement sensor means for sensing a sliding displacement value of the seat in fore and aft directions wherein a first distance is computed responsive to signals output from the first distance sensor means, the angle sensor means and the sliding displacement sensor means, and an occupant position is detected by the first distance and a second distance sensed by the second distance sensor means.

3. An occupant position detection system according to claim 2, wherein the first distance corresponds to a distance to the occupant from the instrument panel which distance is computed on the basis of a distance sensed from a rear side of the occupant, and wherein the first and second distances are compared to detect the occupant position.

* * * * *